US008285546B2

(12) United States Patent
Reich

(10) Patent No.: US 8,285,546 B2
(45) Date of Patent: Oct. 9, 2012

(54) METHOD AND SYSTEM FOR IDENTIFYING AND CORRECTING ACCENT-INDUCED SPEECH RECOGNITION DIFFICULTIES

(75) Inventor: David E. Reich, Jupiter, FL (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 13/228,879

(22) Filed: Sep. 9, 2011

(65) Prior Publication Data
US 2011/0320203 A1 Dec. 29, 2011

Related U.S. Application Data

(63) Continuation of application No. 10/896,405, filed on Jul. 22, 2004, now Pat. No. 8,036,893.

(51) Int. Cl.
G10L 15/14 (2006.01)
G10L 15/00 (2006.01)
G10L 15/18 (2006.01)
G10L 15/10 (2006.01)
G10L 15/28 (2006.01)
G10L 17/00 (2006.01)

(52) U.S. Cl. ........ 704/257; 704/250; 704/254; 704/255; 379/88.08

(58) Field of Classification Search ................ 704/1–10, 704/231–232, 235–257, E17.001–E17.016, 704/E15.001–E15.05; 379/67.1–68, 88.01–88.09, 379/88.11–88.18
See application file for complete search history.

(56) References Cited

U.S. PATENT DOCUMENTS

| 4,748,670 A | * | 5/1988 | Bahl et al. ................. 704/256.1 |
| 5,233,681 A | | 8/1993 | Bahl et al. |
| 5,375,164 A | | 12/1994 | Jennings |
| 5,465,317 A | | 11/1995 | Epstein |
| 5,758,023 A | | 5/1998 | Bordeaux |
| 5,764,851 A | | 6/1998 | Pengwu |
| 5,805,771 A | * | 9/1998 | Muthusamy et al. ......... 704/232 |
| 5,839,106 A | | 11/1998 | Bellegarda |
| 5,865,626 A | | 2/1999 | Beattie et al. |
| 5,963,892 A | | 10/1999 | Tanaka et al. |
| 6,023,670 A | | 2/2000 | Martino et al. |
| 6,067,520 A | | 5/2000 | Lee |
| 6,078,886 A | | 6/2000 | Dragosh et al. |
| 6,085,160 A | | 7/2000 | D'hoore et al. |
| 6,125,341 A | | 9/2000 | Raud et al. |

(Continued)

OTHER PUBLICATIONS

Official Language Act. Department of Justic of Canada. Assented to Jul. 28, 1988. Retrieved Feb. 11, 2011. <http://laws.justice.gc.ca/eng/o-3.01/page-1.html>.*

(Continued)

*Primary Examiner* — Pierre-Louis Desir
*Assistant Examiner* — David Kovacek
(74) *Attorney, Agent, or Firm* — Wolf, Greenfield & Sacks, P.C.

(57) ABSTRACT

A system for use in speech recognition includes an acoustic module accessing a plurality of distinct-language acoustic models, each based upon a different language; a lexicon module accessing at least one lexicon model; and a speech recognition output module. The speech recognition output module generates a first speech recognition output using a first model combination that combines one of the plurality of distinct-language acoustic models with the at least one lexicon model. In response to a threshold determination, the speech recognition output module generates a second speech recognition output using a second model combination that combines a different one of the plurality of distinct-language acoustic models with the at least one distinct-language lexicon model.

23 Claims, 3 Drawing Sheets

U.S. PATENT DOCUMENTS

| | | | |
|---|---|---|---|
| 6,128,596 A | | 10/2000 | Mackie |
| 6,167,377 A * | | 12/2000 | Gillick et al. .................. 704/240 |
| 6,208,964 B1 | | 3/2001 | Sabourin |
| 6,212,500 B1 * | | 4/2001 | Kohler ........................... 704/256 |
| 6,219,643 B1 | | 4/2001 | Cohen et al. |
| 6,223,150 B1 | | 4/2001 | Duan et al. |
| 6,308,155 B1 | | 10/2001 | Kingsbury et al. |
| 6,347,300 B1 | | 2/2002 | Minematsu |
| 6,366,882 B1 | | 4/2002 | Bijl et al. |
| 6,418,431 B1 * | | 7/2002 | Mahajan et al. ........................ 1/1 |
| 6,442,519 B1 | | 8/2002 | Kanevsky et al. |
| 6,460,017 B1 * | | 10/2002 | Bub et al. ........................ 704/256 |
| 6,484,141 B1 | | 11/2002 | Tomoeda |
| 6,490,557 B1 * | | 12/2002 | Jeppesen ........................ 704/235 |
| 6,539,353 B1 | | 3/2003 | Jiang et al. |
| 6,542,866 B1 | | 4/2003 | Jiang et al. |
| 6,622,123 B1 | | 9/2003 | Chanod et al. |
| 6,694,296 B1 | | 2/2004 | Alleva et al. |
| 6,738,745 B1 | | 5/2004 | Navratil et al. |
| 6,848,080 B1 | | 1/2005 | Lee et al. |
| 6,865,528 B1 * | | 3/2005 | Huang et al. ......................... 704/9 |
| 6,879,956 B1 * | | 4/2005 | Honda et al. ................... 704/244 |
| 6,904,405 B2 * | | 6/2005 | Suominen ...................... 704/235 |
| 6,912,499 B1 * | | 6/2005 | Sabourin et al. .............. 704/243 |
| 6,952,674 B2 | | 10/2005 | Forand |
| 6,963,841 B2 * | | 11/2005 | Handal et al. ................. 704/270 |
| 6,996,519 B2 | | 2/2006 | Franco et al. |
| 7,027,987 B1 | | 4/2006 | Franz et al. |
| 7,043,431 B2 | | 5/2006 | Riis et al. |
| 7,149,688 B2 | | 12/2006 | Schalkwyk |
| 7,243,071 B1 * | | 7/2007 | Resnick et al. ................ 704/257 |
| 7,289,958 B2 | | 10/2007 | Bernard et al. |
| 7,292,979 B2 | | 11/2007 | Karas et al. |
| 7,295,979 B2 * | | 11/2007 | Neti et al. ...................... 704/243 |
| 7,299,180 B2 * | | 11/2007 | Wang et al. .................... 704/257 |
| 7,406,408 B1 | | 7/2008 | Lackey et al. |
| 7,412,383 B1 | | 8/2008 | Alonso et al. |
| 7,415,411 B2 | | 8/2008 | Reinhard et al. |
| 7,640,159 B2 | | 12/2009 | Reich |
| 7,716,050 B2 * | | 5/2010 | Gillick et al. .................. 704/254 |
| 7,761,297 B2 * | | 7/2010 | Lee ................................ 704/252 |
| 7,974,843 B2 * | | 7/2011 | Schneider ...................... 704/254 |
| 8,036,893 B2 * | | 10/2011 | Reich ............................. 704/257 |
| 2001/0029453 A1 | | 10/2001 | Klakow et al. |
| 2002/0052742 A1 | | 5/2002 | Thrasher et al. |
| 2002/0055844 A1 | | 5/2002 | L'Esperance et al. |
| 2002/0082831 A1 | | 6/2002 | Hwang et al. |
| 2002/0123891 A1 | | 9/2002 | Epstein |
| 2002/0128831 A1 | | 9/2002 | Ju et al. |
| 2002/0138265 A1 * | | 9/2002 | Stevens et al. ................. 704/251 |
| 2002/0152068 A1 | | 10/2002 | Neti et al. |
| 2002/0156627 A1 * | | 10/2002 | Itoh et al. ....................... 704/254 |
| 2002/0173955 A1 | | 11/2002 | Reich |
| 2002/0184030 A1 | | 12/2002 | Brittan et al. |
| 2003/0004721 A1 | | 1/2003 | Zhou |
| 2003/0023437 A1 | | 1/2003 | Fung |
| 2003/0036903 A1 | | 2/2003 | Konopka et al. |
| 2003/0040907 A1 | | 2/2003 | Chang et al. |
| 2003/0050779 A1 | | 3/2003 | Riis et al. |
| 2003/0055655 A1 * | | 3/2003 | Suominen ...................... 704/276 |
| 2003/0065511 A1 | | 4/2003 | Franco et al. |
| 2003/0083863 A1 | | 5/2003 | Ringger et al. |
| 2003/0093272 A1 * | | 5/2003 | Soufflet et al. ................. 704/231 |
| 2003/0130849 A1 | | 7/2003 | Durston et al. |
| 2003/0182131 A1 | | 9/2003 | Arnold et al. |
| 2003/0191639 A1 * | | 10/2003 | Mazza ........................... 704/231 |
| 2003/0200094 A1 | | 10/2003 | Gupta et al. |
| 2004/0024585 A1 | | 2/2004 | Srivastava et al. |
| 2004/0039570 A1 | | 2/2004 | Harengel et al. |
| 2004/0064322 A1 | | 4/2004 | Georgiopoulos et al. |
| 2004/0153306 A1 | | 8/2004 | Tanner et al. |
| 2004/0230420 A1 | | 11/2004 | Kadambe et al. |
| 2004/0254791 A1 * | | 12/2004 | Coifman et al. .............. 704/246 |
| 2005/0033575 A1 | | 2/2005 | Schneider |
| 2005/0125218 A1 | | 6/2005 | Rajput et al. |
| 2005/0180547 A1 | | 8/2005 | Pascovici |
| 2005/0197835 A1 | | 9/2005 | Reinhard et al. |
| 2005/0197837 A1 | | 9/2005 | Suontausta et al. |
| 2006/0020462 A1 | | 1/2006 | Reich |
| 2006/0020463 A1 | | 1/2006 | Reich |
| 2008/0126093 A1 | | 5/2008 | Sivadas |
| 2008/0147404 A1 | | 6/2008 | Liu et al. |

OTHER PUBLICATIONS

Official Languages Act. Department of Justice of Canada. Assented to Jul. 28, 1988. Retrieved Feb. 11, 2011. <http://laws.justice.gc.ca/eng/o-3.01/page-1.html>.

* cited by examiner

METHOD AND SYSTEM FOR IDENTIFYING AND CORRECTING ACCENT-INDUCED SPEECH RECOGNITION DIFFICULTIES

RELATED APPLICATIONS

This application is a continuation of U.S. patent application Ser. No. 10/896,405, entitled, "METHOD AND SYSTEM FOR IDENTIFYING AND CORRECTING ACCENT-INDUCED SPEECH RECOGNITION DIFFICULTIES," filed on Jul. 22, 2004, which is herein incorporated by reference in its entirety.

FIELD OF THE INVENTION

The present invention relates to the fields of electronic communications and data processing; and, more particularly, to speech recognition systems for use in electronic communication and data processing.

BACKGROUND OF THE INVENTION

Human speech is increasingly used as input for data, instructions, commands, and other information inputted into communication and data processing systems. Speech input can be used, for example, to conduct and record transactions electronically, to request and relay information electronically, and, to provide command and control for various types of electronic communication and/or data processing systems. The use of human speech as the input provides considerable mobility and flexibility in the use of all types of electronic communication and data processing systems, especially systems where the use of peripheral devices such as a keyboard is awkward or inconvenient.

Direct input of speech into electronic systems requires that human speech signals be converted into a machine readable form. Such conversion can be done with conventional speech recognition systems that typically convert voice-induced signals into a sequence of phonetically-based recognition features using spectral analysis of speech segments or a sequence of feature vectors based on linear prediction characteristics of the speech. Such features reflect the various characteristics of the human voice such as pitch, volume, length, tremor, etc.

These speech-derived features provide an acoustic signal of the word to be recognized. The acoustic signal can be compared against an acoustic description or model of phonemes stored electronically in a database to obtain a statistically significant match. For example, each phoneme in the database whose pitch closely matches that of the particular segment of the inputted utterance can be found. Then, to narrow the search for a match, the tremor of each phoneme can be compared to the segment of the inputted utterance. The process can continue until a match having a desired confidence level is obtained.

In many speech recognition systems, for example, the acoustic signal is converted by an A/D converter into a digital representation of the successive amplitudes of the audio signal created by the underlying speech and then converted into a frequency domain signal consisting of a sequence of frames, each of which provides the amplitude of the speech signal in each of a plurality of frequency bands. The sequence of frames produced by the speech to be recognized is compared with a sequence of nodes, or frame models, corresponding to the acoustic model.

Accordingly, a sequence of phonemes based on the underlying speech input is obtained. This sequence is then compared to phoneme groupings corresponding to speech segment comprising one or more sentences, a phrase, or an individual word.

A language model can also be used to reduce the computational demands and increase the likelihood of a correct match. The particular language model typically predicts the relative likelihood of the occurrence of each word in the speech recognition system vocabulary given other words that have been identified in connection with the specific speech utterance. These predictions are based on the fact that the likelihood of a given word having been spoken is a function of its context as expressed by the other words in a sentence or segment of speech. The likelihoods can be determined, for example, by analyzing a large body of text and determining from that text the number of times that each word in the vocabulary is preceded by each other word in the vocabulary. Digram language models, for example, give the likelihood of the occurrence of a word based on the word immediately preceding. Trigram language models, similarly, base likelihood on the occurrence of the two immediately preceding words. Some speech recognition systems need no grammatical filtering to increase their accuracy.

When the speech recognition system cannot identify a match, the speaker can be requested by the system to choose the correct word from a list of candidate words. If the speech recognition system makes an incorrect match, the speaker can be provided an opportunity to correct the choice. Such selection and/or changes can be fed back into the speech recognition system and stored in a reference table to improve the accuracy of the system.

In conventional speech recognition systems, the acoustic and language models used are typically specific to the language of the system. As already described, however, the recognition of a word depends on the translation of aural patterns into discrete, recognizable features representative of physical phenomena such as pitch, volume, and tremor. Accordingly, the accuracy of the speech recognition system depends critically on how well the speaker articulates the words he or she speaks. This, in turn, depends significantly on whether and to what extent the speaker speaks with an accent. It is this factor that frequently makes distinguishing and accurately recognizing the speech of non-native speakers of the language of the system highly problematic.

Proposed solutions to this problem include installing speech recognition engines for different languages and requesting that the user specify which language he or she would like to use. This solution is not viable, however, in every instance in which a non-native speaker is using a speech recognition system. For example, the speaker may wish to use a particular language despite being accented in another language. In situations in which the user interface of the speech recognition system is only available in a particular language, the speaker has no recourse but to use that language.

Another proposed solution is to independently create an entirely new system incorporating pronunciation variants to attempt to improve the accuracy of the speech recognition system. Such a solution, however, may have only a limited ameliorative effect on accuracy and, in any event, almost certainly would increase the costliness of providing such a speech recognition system. Moreover, a system using a vast number of accent combinations is likely to be infeasible owing to the considerable portion of a processor's memory that would likely need to be allocated in order to store the acoustic and language models associated with such a system.

Even more problematic is the fact that if a non-native speaker's accent is sufficiently severe, the user interface can be rendered completely unusable. In this latter event, the speaker is unable to communicate his or her difficulties in a fashion that a conventional speech recognition system can recognize, and the system is unlikely to have any way of ascertaining the nature of the problem on its own. It is unlikely that a conventional speech recognition system is able to identify the source of the problem. The problem conceivably could be due to the speaker's uttering incoherent gibberish or, even more likely, it could be due to an adverse audio environment. A conventional speech recognition system typically would not be able to distinguish between these two sources of the problem, let alone recognize whether the problem's source is due to a speaker's having a moderate or heavy accent. It follows, therefore, that conventional speech recognition systems are unable to identify and ameliorate speech recognition problems stemming from an accented speaker's attempting to communicate in a non-native language.

SUMMARY OF THE INVENTION

The present invention provides a system and methods for identifying when an unsatisfactory speech recognition result is due to a non-native speaker's accent. Moreover, the invention provides a system and methods for identifying a combination of acoustic and lexicon models that compensates for a non-native speaker's accent. The system and methods of the invention provide these advantages without the need for constructing new or different acoustic models incorporating accent compensating variations. They also avoid using a considerable portion of a processor's memory, as would otherwise be necessary for storing acoustic and language models that incorporate such accent compensating variations.

A system for use in speech recognition according to one embodiment of the invention can include an acoustic module that accesses a plurality of distinct-language acoustic models, each based upon a different language, and a lexicon module that accesses at least one lexicon model. The system also can include a speech recognition output module that generates a first speech recognition output using a first model combination that combines one of the plurality of distinct-language acoustic models with the at least one lexicon model, and, in response to a threshold determination, generates a second speech recognition output using a second model combination that combines a different one of the plurality of distinct-language acoustic models with the at least one distinct-language lexicon model.

A method according to one embodiment of the invention is generates speech recognition output using a plurality of distinct-language acoustic models, each based upon a different language, and at least one lexicon model. The method can include generating a first speech recognition output using a first model combination that combines one of the plurality of distinct-language acoustic models with the at least one lexicon model, and, in response to a threshold determination, generating a second speech recognition output using a second model combination that combines a different one of the plurality of distinct-language acoustic models with the at least one distinct-language lexicon model.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF PREFERRED EMBODIMENTS

Figure 1:
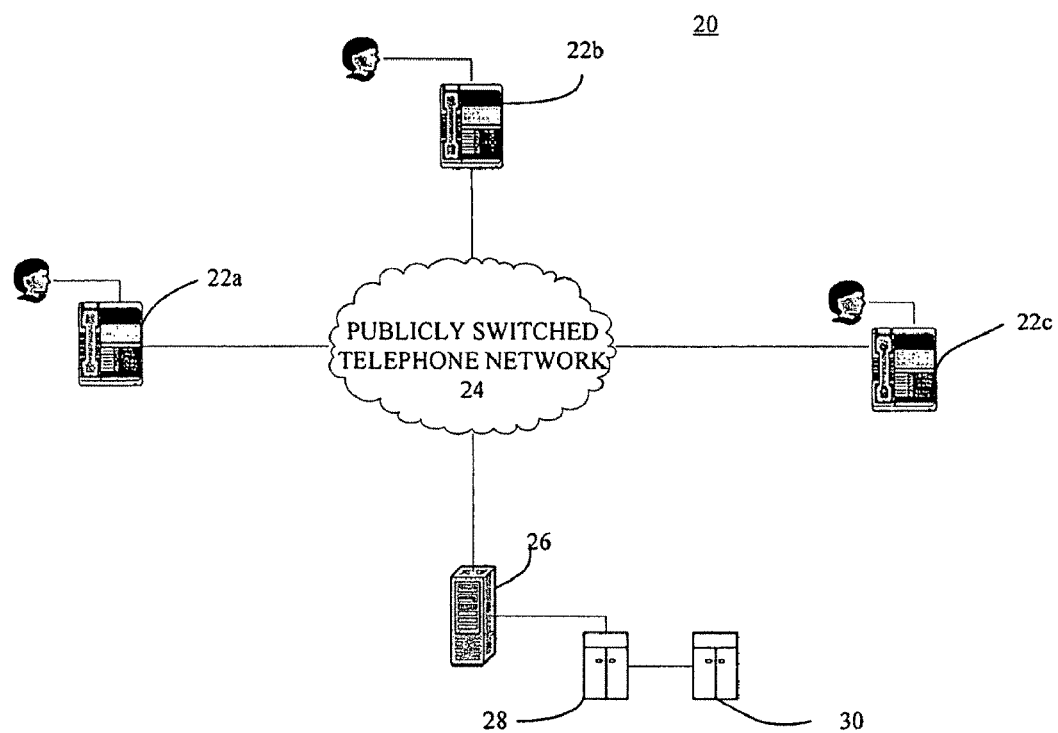
FIG. 1 is a schematic diagram of a communication network in which a system according to one embodiment of the present can be used.

FIG. 1 provides a schematic diagram of a communications network 20, which includes a system 30 according to one embodiment of the present invention. Although the invention is discussed in the context of the communications network 20, it is to be understood that the communication network represents only one environment in which the system 30 can be advantageously employed. Many other uses and applications of the system 30 in different communication and data processing environments will be apparent from the description provided herein. Indeed, the system 30 can be advantageously used with any telecommunication or data processing device in which data, instructions, or other information is inputted in the form of human speech.

As shown in FIG. 1, the communication network 20 illustratively includes a plurality of telephones 22a, 22b, 22c that connect a multiplicity of callers via a publicly switched telephone network 24 to a voice server 26. The voice server 26 can be used by a business or governmental agency to provide automated telephonic services to each of the callers.

Such automated telephonic services can be used by a business, for example, to undertake a variety of transactions in which the caller conveys and/or receives voice information over a telephony-based or other communication network. Examples of the transactions that can be conducted in this manner by businesses and consumers include personal and commercial financing transactions, over-the-phone loan processing, account processing, airline and automobile reservation setting, and a host of other routine and non-routine business and commercial transactions.

The voice server 26 can facilitate such transactions through the use of one or more software-based voice applications, for example. As will be readily understood by those of ordinary skill in the art, such applications can include applications programs written, for example, in an XML programming language such as VoiceXML. These applications enable the voice server 26 to operate as a fully automated, virtual call center for the business. One such software application is the Websphere® voice server platform made by International Business Machines Corporation of Armonk, N.Y.

Governmental entities similarly can use the voice server 26 on which is running a VoiceXML or other XML programming language for conducting governmental transactions over the telephone. Such transactions can include, for example, renewing a driver's license or registering for a social service. As the sophistication of XML applications increases, it will be possible for businesses and government agencies to conduct an ever greater number of routine or even non-routine commercial and governmental transactions by telephone.

In each of the various scenarios described, the caller is able to provide information directly to the voice server 26 by simply speaking into a telephone or other voice input device. Other voice input devices can include, for example, personal digital assistants (PDAs), voice-capable computers, as well as other devices capable of effecting circuit-based or packet-based communications, such as VoIP. It is highly desirable that a caller in each of the above scenarios be able communicate with the voice server 26 through the direct input of speech. This is so, for example, if the caller does not have access to a touch-tone telephone. It can be even more critical in other contexts, such as those involving callers who are visually impaired. It also avoids having to provide the caller with a keyboard interface or restricting communications to those carried out using a computer connected to a data communication network.

A speech recognition device 28 is illustratively connected to the voice server 26. The speech recognition device 28 includes a voice signal processor (not shown) that generates at least one feature vector based upon a voice-induced electrical signal that results from speech input. A feature vector can be an n-tuple whose elements correspond to one or more physical phenomena that characterize a spoken word or speech segment, such as pitch, volume, and tremor. Typically, an acoustic signal generated by a human utterance is inputted into the voice signal processor, which by an analog-to-digital (A/D) conversion, converts the acoustic signal into a digital representation of a set of measurements of the utterance, including its volume, frequency, and pitch, which can be represented by the feature vector.

For example, the acoustic signal can be converted by an A/D converter into a digital representation of the successive amplitudes of the audio signal created by the underlying speech and then converted into a frequency domain signal consisting of a sequence of frames, each of which provides the amplitude of the speech signal in each of a plurality of frequency bands. Other features based on the acoustic signal can be similarly determined on a frame-by-frame basis.

The speech-derived feature vectors thus provide a quantifiable representation of an underlying acoustic signal. The elements of a feature vector can be compared by the speech recognition device 28 to corresponding acoustic descriptions of various phonemes of the underlying language of the speech segment or word that is to be recognized. A library of the acoustic descriptions of known phonemes of the language, defining the acoustic model of the language, can be stored in a database of the recognition device 28. The speech segment or word, accordingly, is recognized by finding a match between the feature vector representation of the acoustic signal and a particular phoneme sequence. By correctly identifying each of the phonemes that comprise the sequence, a speech segment or word can be correctly recognized by the speech recognition device 28 then matching known words of the underlying language to the phoneme sequence that has been generated on the basis of the acoustic model.

An inherent problem with conventional speech recognition devices is that the acoustic representation that is compared to the acoustic model may be skewed or biased as a result of the particular speaker's pronunciation, which can severely and adversely affect the accuracy of the speech recognition. This is especially so for a non-native speaker who speaks with an accent. Moreover, a conventional speech recognition device is unlikely to identify the source of the problem since a conventional system typically can not tell whether the problem is due to the speaker's uttering incoherent gibberish, whether it is due to a harsh audio environment, or whether it is due to a speaker's accent.

The illustrated embodiment of the invention mitigates against this problem by providing a system 30 that identifies and ameliorates the adverse effects that a heavy or moderate accent of a non-native speaker can have on the speech recognition device 28. The system 30 is illustratively connected to the speech recognition device 28. As will be clear from the ensuing discussion, the system 30 can include software instructions and related database elements configured to run on and be stored in the voice server 26, respectively. Alternately, the system 30 can comprise dedicated circuitry including logic gates and memory. Moreover, the system 30 can comprise a combination of software and circuitry.

Figure 2:
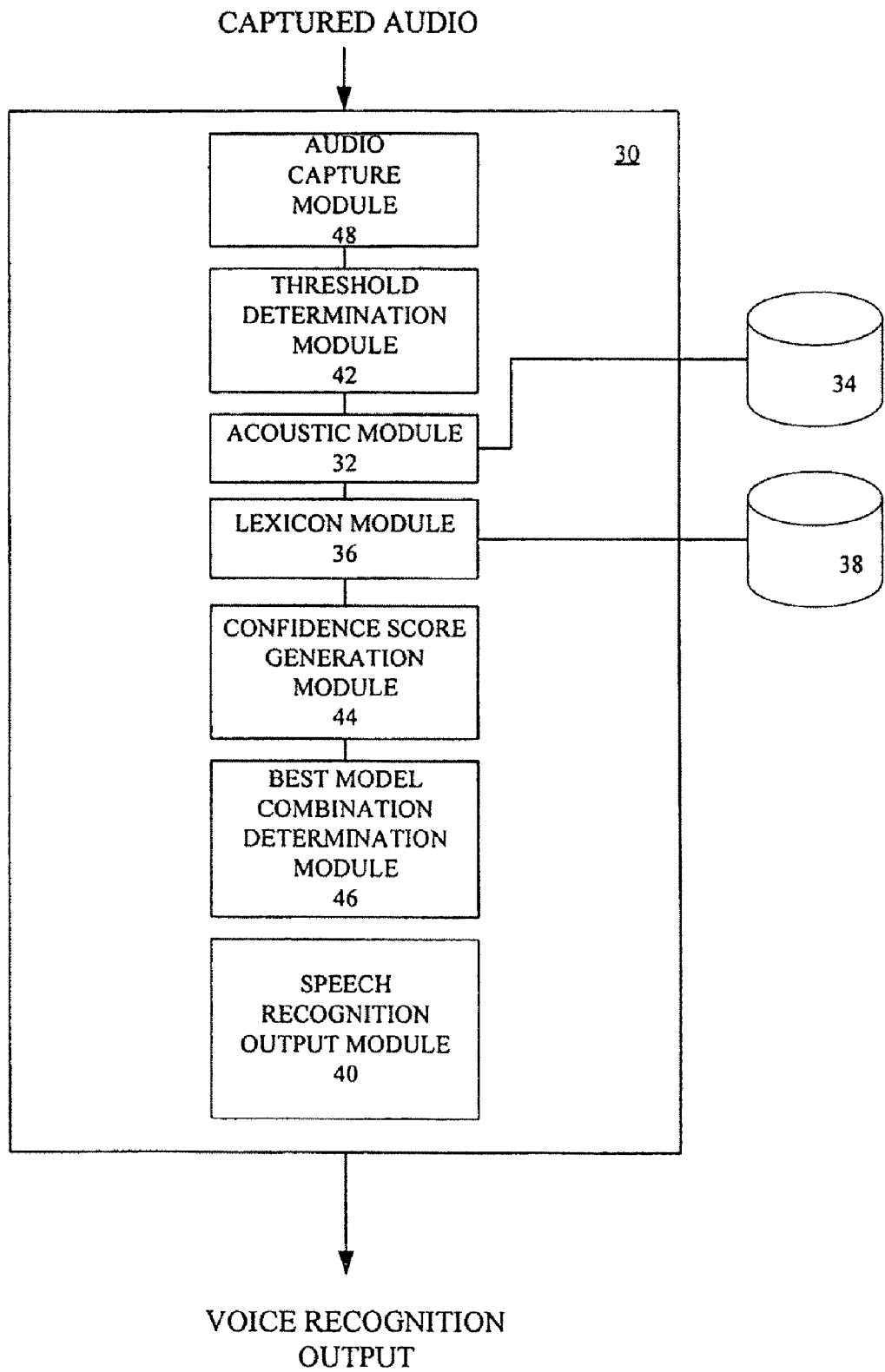
FIG. 2 is a schematic diagram of a system according to one embodiment of the present invention.

FIG. 2 is a schematic diagram of one embodiment of the system 30. The system illustratively includes an acoustic module 32 that accesses a plurality of distinct-language acoustic models 34, each being based upon a different language. Each of the distinct-language acoustic models thus provides a library of the acoustic descriptions of known phonemes for a particular language. As already noted, and as will be readily understood by those of ordinary skill in the art, speech recognition is effected by a procedure of look-up and match. That is, the elements of an acoustic model are looked-up and matched against frames or segments of the speech signal supplied to the voice signal processor so as to identify a sequence of one or more phonemes corresponding to the inputted speech signal. This look-up and match procedure thus generates for any given speech segment a sequence of phonemes that illustratively provides a digital representation of the underlying speech that is to be recognized.

The particular languages on which any one of the plurality of distinct-language acoustic models 34 is based can include any world language, such as English or Spanish, any regional language, or any national language. Illustratively, the acoustic models 34 accessible to the acoustic module 32 are contained in one or more databases that can be electronically stored and accessed using known processing devices and techniques, as will also be well understood by those of ordinary skill in the art.

The system 30 also illustratively includes a lexicon module 36 that accesses at least one lexicon model 38 of a particular language. The phoneme sequence, or more specifically its digital representation, of an underlying speech segment determined using the acoustic module 32 is compared by the lexicon module 36 to the elements of the lexicon model 38 so as to identify speech segments or words in the language of the lexicon model.

Illustratively, the system 30 further includes a speech recognition output module 40 that generates a first speech recognition output using a first model combination, which combines one of the plurality of distinct-language acoustic models 34 with the at least one lexicon model 38.

If a caller happens to be a non-native speaker of the language used by the voice server 26 for conducting automated transactions, a problem can arise if the speaker has a heavy or moderate accent. For example, the voice server 26 might be configured to conduct automated transactions in English, but the caller might be a native speaker of Spanish and have a thick or moderate Spanish accent when speaking English. Initially, as with many conventional speech recognition devices, the speech recognition output is likely to be generated using an English acoustic model and an English lexicon model, since it is ordinarily assumed that callers are native speakers of, in this example, English. The caller's accent, however, will likely cause less than satisfactory speech recognition results being generated by the speech recognition output module 40. The system 30, as described below, will note these less than satisfactory results as a threshold determination, and respond by generating a second speech recognition output using a second model combination that combines a different one of the plurality of distinct-language acoustic models 34 with the distinct-language lexicon model 38.

As long as the speech recognition output generates less than satisfactory results, the system 30 iteratively continues to try new model combinations using a different one of the plurality of distinct-language acoustic models 34 and the distinct-language lexicon model 38. If in the particular scenario under discussion, the plurality of distinct-language acoustic models 34 includes Spanish, then eventually the iterative process will yield a speech recognition output generated using the Spanish acoustic model and the English lexicon model. This combination is likely to generate the best speech recognition results since the speaker's accent will be obviated by identifying the corresponding phoneme sequence using the acoustic model of the speaker's native tongue but matching the resulting phoneme sequence to a speech segment in the desired language, which in this particular scenario is English. The non-native speaker with heavy or moderate Spanish accent is likely to pronounce, for example, the vowel "e" much like a long "a" in English. In using the Spanish acoustic model 34, however, the system 30 generates a phoneme sequence that more closely approximates an "e" rather than an "a." With the phoneme sequence being thus correctly identified using the Spanish acoustic model 34, the lexicon module 36 is able to search for a match in the lexicon model 38 based on the correctly identified "e" rather than erroneously treating the underlying sound as corresponding to an English language "a." The system 30 likewise handles sounds associated, for example, with the English language vowel "i," which a speaker with a Spanish accent is more likely to pronounce as an English language "e."

Although this example has only considered certain aspects of correctly recognizing English words spoken in English by a speaker with a Spanish accent, it will be readily apparent that the system 30 can similarly handle other accent-based pronunciation deviations that are likely to occur with any non-native speaker of a language. The system 30 is equally facile in identifying and handling other language combinations besides Spanish-English by the appropriate combination of an acoustic model 34 in one language for the first-language acoustic module 32 and a lexicon model 38 in a different language for the second-language lexicon module 36. The salient characteristic of the system 30 is that, for the non-native speaker of a particular language, the first-language acoustic module 32 is based on an acoustic model for the speaker's native language, and the second-language lexicon module 36 is based on a lexicon model for the language in which the non-native speaker desires to, or must, converse.

A significant advantage of the system 30 is that it obviates the need to construct a new or different acoustic model that incorporates pronunciation variants or other compensative variations for overcoming the difficulties posed by the non-native speaker's accent. Instead, the system 30 need only incorporate a standardized acoustic module based on the speaker's native language and combine it with the appropriate lexicon module for speech recognition in the desired language. This reduces the cost and complexity of effecting speech recognition for a host of non-native speakers whose speech is to be recognized in a variety of desired languages.

Illustratively, the system 30 includes an optional threshold determination module 42 for making a threshold determination regarding whether the speech recognition output generated by the speech recognition output module 40 is satisfactory. The determination is illustratively accomplished by generating a confidence score for the initial speech recognition output. The confidence score can be based on a probability assessment that the underlying phonemic sequence determined by the distinct-language acoustic module 32 corresponds to the recognized word or speech segment determined by the distinct-language lexicon module 36. Various models for assessing the probability are known to those of ordinary skill in the art, including for example linear prediction coding, auto-regression methods, as well as other statistical techniques. The system 30 illustratively compares a first confidence score for the first speech recognition output with a minimum acceptable score.

The system 30 illustratively includes an optional confidence score generation module 44 that generates a confidence score for each speech recognition output generated by the speech recognition output module 40 using the different combinations of different distinct-language acoustic models 34 and the distinct-language lexicon model 38. Illustratively, the system 30 further includes a best model combination determination module 46 that determines a best model combination based upon the confidence scores. The best model combination, therefore, corresponds to the particular combination of distinct-language acoustic model 34 and distinct-language lexicon model 36 that generates the speech recognition output having the highest confidence score.

The system 30, as illustrated, optionally includes an audio capture module 48 that can be used in the following manner. If the system 30 makes a threshold determination, as already described, then the audio capture module 48 can capture and store raw audio that is used to generate the different speech recognition output results obtained using the various combinations of the different distinct-language acoustic models 34 with the distinct-language lexicon model 38. In some situations, this module can be superfluous since some system administrators mandate that audio be captured automatically.

In alternate embodiment, the lexicon model comprises a plurality of distinct-language lexicon models. Each distinct-language lexicon model is based upon a different language. Accordingly, the speech recognition output module 40 is able to generate additional speech recognition outputs using different model combinations comprising different pairings of the plurality distinct-language acoustic models with the plurality of distinct language lexicon models. Moreover, according to this particular embodiment, the confidence score generation module 42 can generate confidence scores for each of the speech recognition outputs generated using a different combination of distinct-language acoustic models and distinct-language lexicon models.

Once the system 30 determines the best model combination, as described above, the voice server 26 can be dynamically reconfigured to continue using the corresponding combination of distinct-language acoustic model 34 and distinct-language lexicon model 36 for the first-language acoustic module 32 and second-language lexicon module 36 in generating voice recognition output for a particular caller. Accordingly, the system 30 causes the voice server 26 to dynamically adapt to the accented speech of a caller whose native language is different than the one in which the caller desires to, or must, converse with the voice server. The system 30 similarly enables other telecommunication and data processing devices that receive data, instructions, or other information input in the form of human speech, the system thus causing such devices to dynamically adapt to speech input provided by a non-native speaker of the language used by a particular device.

Figure 3:
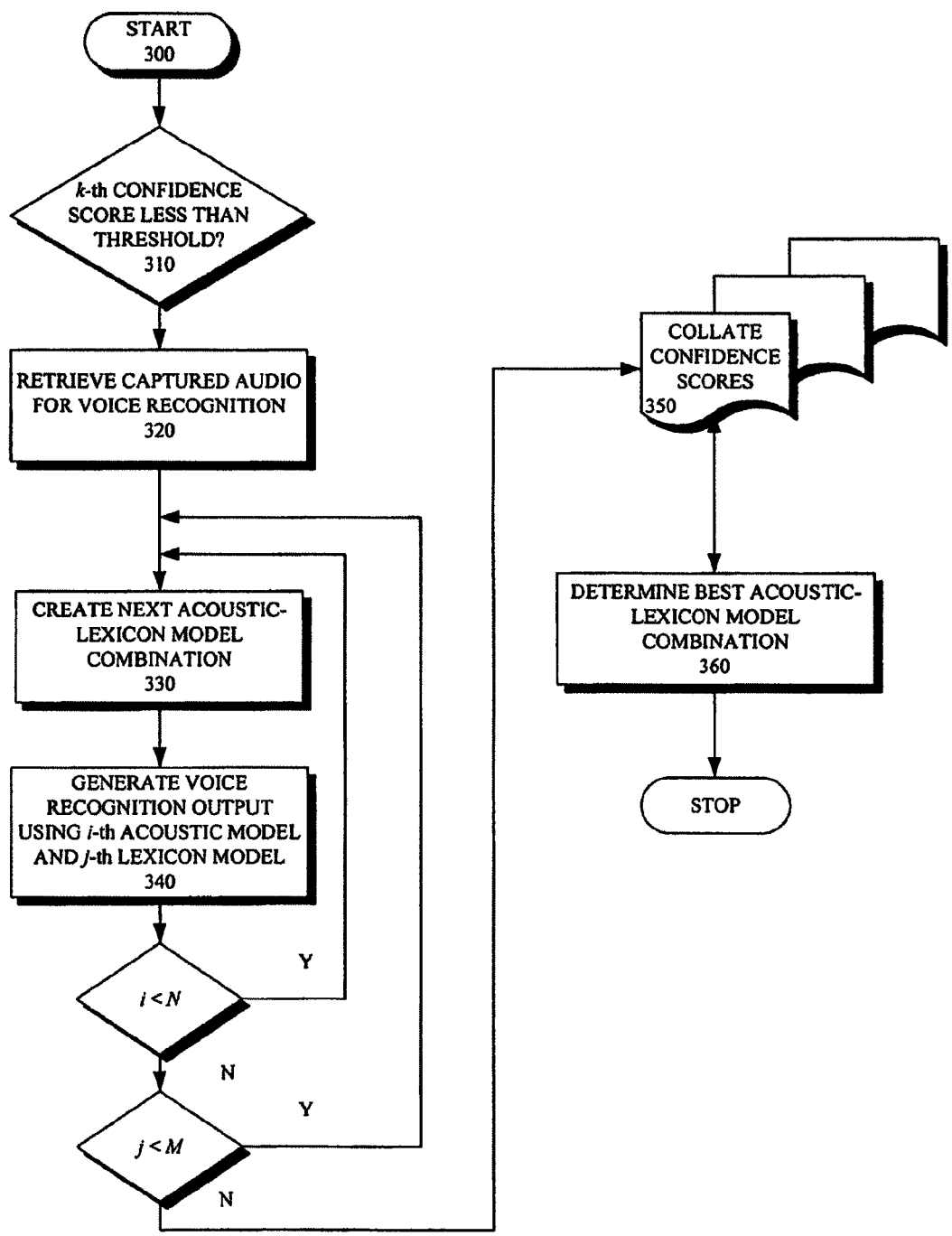
FIG. 3 provides a flowchart illustrating one embodiment of a method aspect of the invention.

FIG. 3 provides a flowchart illustrating one embodiment of the method aspects of the present invention. The method 300 can be employed in generating speech recognition output using a plurality of distinct-language acoustic models, each based upon a different language, and at least one lexicon model. The method includes the step 310 of making a determination as to whether a threshold condition is satisfied. For example, several speech recognition outputs generated using a particular acoustic model and a particular lexicon models might, especially if the speaker is non-native speaker with a thick or moderate accent, yield unsatisfactory confidence scores.

In response to the threshold determination, the method 300 identifies one model combination from among the multiplicity of different model combinations that can be made by combining different ones of the plurality of acoustic models with the at least one lexicon module. The model combination so identified defines a best model combination and is the combination that yields better speech recognition output results than any of the other possible model combinations.

Accordingly, the method 300 includes generating a first speech recognition output using a first model combination that combines one of the plurality of distinct-language acoustic models with the at least one lexicon model, and, in response to the threshold determination, generating a second speech recognition output using a second model combination that combines a different one of the plurality of distinct-language acoustic models with the at least one distinct-language lexicon model. In step 320, the method includes retrieving a captured audio segment for use in iteratively attempting to obtain better speech recognition results using alternate combinations of different ones of the plurality of distinct-language acoustic models with the at least one distinct-language lexicon mode Steps 330 and 340 iteratively repeat the process until acceptable speech recognition outputs are obtained by creating a new acoustic-lexicon model combination and generating new speech recognition outputs with the new combination.

Optionally, the method 300 includes generating a confidence score for each new speech recognition output obtained using a different combination. The confidence scores are collated in step 350. Illustratively, the method 300 further includes the optional step 360 of determining the best acoustic-lexicon model combination on the basis of the confidence scores.

According to one embodiment, a first confidence score is determined for the first speech recognition output, and the threshold determination is made based upon a comparison of the first confidence score with a minimum acceptable score. The method further can include generating confidence scores for each speech recognition output and determining a best model combination based upon the confidence scores.

Like the various embodiments of a system according to the present invention, the various embodiments of the method aspects of the present invention can be realized in hardware, software, or a combination of both. Moreover, these and other embodiments of the present invention also can be realized in a centralized fashion in one computer system, or in a distributed fashion whereby different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method comprising:
generating a first speech recognition result for a first speech input in a first language provided by a speaker; and
outputting the first speech recognition result;
wherein generating the first speech recognition result comprises:
identifying a sequence of phonemes corresponding to the first speech input using a native acoustic model specific to a second language different from the first language, wherein the second language is the speaker's native language; and
matching the sequence of phonemes to one or more speech segments and/or words using a lexicon model specific to the first language and not to the second language.

2. The method of claim 1, further comprising:
generating a second speech recognition result for the first speech input using an acoustic model specific to the first language and the lexicon model specific to the first language;
wherein the first speech recognition result is generated in response to the second speech recognition result having a confidence score below a minimum acceptable score.

3. The method of claim 2, further comprising:
in response to the second speech recognition result having the confidence score below the minimum acceptable score, generating a third speech recognition result for the first speech input using the lexicon model specific to the first language and an acoustic model specific to a third language different from the first and second languages;
wherein the first speech recognition result is generated in response to the third speech recognition result having a confidence score below the minimum acceptable score.

4. The method of claim 2, further comprising:
in response to the second speech recognition result having the confidence score below the minimum acceptable score, generating a third speech recognition result for the first speech input using the lexicon model specific to the first language and an acoustic model specific to a third language different from the first and second languages;
wherein the first speech recognition result is output in response to the first speech recognition result having a better confidence score than the third speech recognition result.

5. The method of claim 1, further comprising:
generating a second speech recognition result for the first speech input using an acoustic model specific to the first language and the lexicon model specific to the first language;
wherein the first speech recognition result is output in response to the first speech recognition result having a better confidence score than the second speech recognition result.

6. The method of claim 1, further comprising:
generating a second speech recognition result for the first speech input using the lexicon model specific to the first language and an acoustic model specific to a third language different from the first and second languages;

wherein the first speech recognition result is output in response to the first speech recognition result having a better confidence score than the second speech recognition result.

7. The method of claim 1, further comprising designating the native acoustic model specific to the second language for use in recognizing subsequent speech input spoken by the speaker.

8. The method of claim 1, further comprising generating a second speech recognition result for a second speech input in the second language, wherein generating the second speech recognition result comprises:
   identifying a sequence of phonemes corresponding to the second speech input using the native acoustic model specific to the second language; and
   matching the sequence of phonemes to one or more speech segments and/or words using a lexicon model specific to the second language.

9. A system comprising a combination of hardware and software that implements:
   an audio capture module configured to capture a first speech input in a first language from a speaker; and
   a speech recognition module configured to generate a first speech recognition result for the first speech input, and output the first speech recognition result;
   wherein generating the first speech recognition result comprises:
      identifying a sequence of phonemes corresponding to the first speech input using an acoustic model specific to a second language different from the first language, wherein the acoustic model is trained on speech of a training speaker, wherein the second language is the training speaker's native language; and
      matching the sequence of phonemes to one or more speech segments and/or words using a lexicon model specific to the first language and not to the second language.

10. The system of claim 9, wherein the speech recognition module is configured to:
   generate a second speech recognition result for the first speech input using an acoustic model specific to the first language and the lexicon model specific to the first language; and
   generate the first speech recognition result in response to the second speech recognition result having a confidence score below a minimum acceptable score.

11. The system of claim 10, wherein the speech recognition module is configured to:
   in response to the second speech recognition result having the confidence score below the minimum acceptable score, generate a third speech recognition result for the first speech input using the lexicon model specific to the first language and an acoustic model specific to a third language different from the first and second languages; and
   generate the first speech recognition result in response to the third speech recognition result having a confidence score below the minimum acceptable score.

12. The system of claim 10, wherein the speech recognition module is configured to:
   in response to the second speech recognition result having the confidence score below the minimum acceptable score, generate a third speech recognition result for the first speech input using the lexicon model specific to the first language and an acoustic model specific to a third language different from the first and second languages; and
   output the first speech recognition result in response to the first speech recognition result having a better confidence score than the third speech recognition result.

13. The system of claim 9, wherein the speech recognition module is configured to:
   generate a second speech recognition result for the first speech input using an acoustic model specific to the first language and the lexicon model specific to the first language; and
   output the first speech recognition result in response to the first speech recognition result having a better confidence score than the second speech recognition result.

14. The system of claim 9, wherein the speech recognition module is configured to:
   generate a second speech recognition result for the first speech input using the lexicon model specific to the first language and an acoustic model specific to a third language different from the first and second languages; and
   output the first speech recognition result in response to the first speech recognition result having a better confidence score than the second speech recognition result.

15. The system of claim 9, wherein the speech recognition module is further configured to generate a second speech recognition result for a second speech input in the second language, wherein generating the second speech recognition result comprises:
   identifying a sequence of phonemes corresponding to the second speech input using the acoustic model specific to the second language; and
   matching the sequence of phonemes to one or more speech segments and/or words using a lexicon model specific to the second language.

16. An article of manufacture comprising a computer-readable storage medium storing computer instructions for:
   generating a first speech recognition result for a first speech input in a first language; and
   outputting the first speech recognition result;
   wherein generating the first speech recognition result comprises:
      identifying a sequence of phonemes corresponding to the first speech input using an acoustic model specific to a second language different from the first language, wherein the acoustic model is trained on speech of a training speaker, wherein the second language is the training speaker's native language; and
      matching the sequence of phonemes to one or more speech segments and/or words using a lexicon model specific to the first language and not to the second language.

17. The article of manufacture of claim 16, wherein the computer-readable storage medium stores further computer instructions for:
   generating a second speech recognition result for the first speech input using an acoustic model specific to the first language and the lexicon model specific to the first language;
   wherein the first speech recognition result is generated in response to the second speech recognition result having a confidence score below a minimum acceptable score.

18. The article of manufacture of claim 17, wherein the computer-readable storage medium stores further computer instructions for:
   in response to the second speech recognition result having the confidence score below the minimum acceptable score, generating a third speech recognition result for the first speech input using the lexicon model specific to the first language and an acoustic model specific to a third language different from the first and second languages;
wherein the first speech recognition result is generated in response to the third speech recognition result having a confidence score below the minimum acceptable score.

19. The article of manufacture of claim 17, wherein the computer-readable storage medium stores further computer instructions for:
in response to the second speech recognition result having the confidence score below the minimum acceptable score, generating a third speech recognition result for the first speech input using the lexicon model specific to the first language and an acoustic model specific to a third language different from the first and second languages;
wherein the first speech recognition result is output in response to the first speech recognition result having a better confidence score than the third speech recognition result.

20. The article of manufacture of claim 16, wherein the computer-readable storage medium stores further computer instructions for:
generating a second speech recognition result for the first speech input using an acoustic model specific to the first language and the lexicon model specific to the first language;
wherein the first speech recognition result is output in response to the first speech recognition result having a better confidence score than the second speech recognition result.

21. The article of manufacture of claim 16, wherein the computer-readable storage medium stores further computer instructions for:
generating a second speech recognition result for the first speech input using the lexicon model specific to the first language and an acoustic model specific to a third language different from the first and second languages;
wherein the first speech recognition result is output in response to the first speech recognition result having a better confidence score than the second speech recognition result.

22. The article of manufacture of claim 16, wherein the computer-readable storage medium stores further computer instructions for designating the acoustic model specific to the second language for use in recognizing subsequent speech input spoken by a speaker who spoke the first speech input.

23. The article of manufacture of claim 16, wherein the computer-readable storage medium stores further computer instructions for generating a second speech recognition result for a second speech input in the second language, wherein generating the second speech recognition result comprises:
identifying a sequence of phonemes corresponding to the second speech input using the acoustic model specific to the second language; and
matching the sequence of phonemes to one or more speech segments and/or words using a lexicon model specific to the second language.

* * * * *